US011819985B1

(12) United States Patent
Schley et al.

(10) Patent No.: US 11,819,985 B1
(45) Date of Patent: Nov. 21, 2023

(54) HARMONIC DAMPER PULLEY PULLER

(71) Applicant: Schley Products, Inc., Anaheim Hills, CA (US)

(72) Inventors: Chad Schley, Villa Park, CA (US); Tim Hume, Orange, CA (US); Jeff Marshall, Placentia, CA (US)

(73) Assignee: Schley Products, Inc., Anaheim, CA (US)

( * ) Notice: Subject to any disclaimer, the term of this patent is extended or adjusted under 35 U.S.C. 154(b) by 997 days.

(21) Appl. No.: 16/655,029

(22) Filed: Oct. 16, 2019

Related U.S. Application Data

(60) Provisional application No. 62/746,501, filed on Oct. 16, 2018.

(51) Int. Cl.
  B25B 27/02 (2006.01)
  F16H 55/36 (2006.01)
  F16H 55/08 (2006.01)
  B25J 5/02 (2006.01)
  B25B 23/10 (2006.01)
  B25J 15/02 (2006.01)

(52) U.S. Cl.
  CPC .......... B25B 27/023 (2013.01); B25B 23/103 (2013.01); F16H 55/0833 (2013.01); F16H 55/36 (2013.01); B25J 15/0273 (2013.01)

(58) Field of Classification Search
  CPC ..... B25B 27/023; B25B 27/02; B25B 23/103; Y10T 29/5387; Y10T 29/53874
  See application file for complete search history.

(56) References Cited

U.S. PATENT DOCUMENTS

| | | | | |
|---|---|---|---|---|
| 4,649,615 A | * | 3/1987 | Hundley | B25B 27/023 29/261 |
| 5,557,833 A | * | 9/1996 | Pool | B25B 27/023 29/261 |
| 5,735,033 A | * | 4/1998 | Marugg | B25B 27/023 29/259 |
| 5,887,328 A | * | 3/1999 | Rydin | B25B 27/02 29/259 |
| 6,665,918 B1 | * | 12/2003 | Williams | B25B 27/023 29/259 |
| 7,117,573 B1 | * | 10/2006 | Hu | B25B 27/023 29/261 |

(Continued)

OTHER PUBLICATIONS

Moore1/Moore Good Ink; "LS, Coyote & Chrysler: Remedy for Stubborn Harmonic Damper Removal", Feb. 7, 2017 [https://mooregoodink.com/ls-coyote-chrysler-remedy-for-stubborn-harmonic-damper-removal/].

(Continued)

*Primary Examiner* — Seahee Hong
(74) *Attorney, Agent, or Firm* — Stetina Brunda Garred & Brucker

(57) ABSTRACT

A pulley pulling device for removing a harmonic damper pulley having at least two spoke portions from a crankshaft comprises a hub including at least two clevis portions. A plurality of legs are pivotably connected to respective ones of the clevis portions, with the legs each including a body portion and a foot portion protruding laterally therefrom. The body and foot portions are contoured and oriented relative to each other such that the foot portion is adapted to engage a corresponding one of the spoke portions and to selectively pivot relative thereto as achieves optimized contact therebetween.

20 Claims, 11 Drawing Sheets

(56) References Cited

U.S. PATENT DOCUMENTS 7,818,860 B2     10/2010  Hume et al.
8,015,683 B2 *    9/2011  Hume ................... B25B 27/023
                                                      29/259

OTHER PUBLICATIONS

MAC Tools; "Ratchet Arm Harmonic Balancer Pulley Puller" https://www.mactools.com/en-us/Specialty-Tools/Pullers-and-Slide-Hammers/HB531B/Harmonic-Balancer-Puller-and-Installer-Set. 2018.

* cited by examiner

HARMONIC DAMPER PULLEY PULLER

CROSS-REFERENCE TO RELATED APPLICATIONS

This application claims the benefit of U.S. Provisional application No. 62/746,501, filed Oct. 16, 2018, the contents of which are expressly incorporated herein by reference.

STATEMENT RE: FEDERALLY SPONSORED RESEARCH/DEVELOPMENT

Not Applicable

BACKGROUND

Automotive vehicles have a harmonic damper in the form of a pulley through which the serpentine belt passes. The pulley is attached to an end of the crankshaft, often with a slow taper friction interference. These connections are notoriously tight and removing the harmonic damper pulley can be very difficult.

Tools for removing the harmonic damper pulley are known. These tools are designed to have pivoting arms so that they can be inserted between the spokes of the pulley and grip a hub of the pulley from front to rear. A central threaded shaft or threaded rod extends from a hub to which the pivoting arms are attached and may be used to bear against the shaft. As the threads are turned on the threaded rod, the pulling force is increased on the pulley, and eventually, the friction is overcome, and the pulley removed.

However, the hub of the pulley is a difficult location to grip. Thus, there is a need for a tool that can effectively pull the harmonic damper pulley, but with even greater ease of use.

BRIEF SUMMARY

Disclosed is a device for removing a harmonic damper pulley. The device may include a hub. The hub may include a plurality of pairs of connection elements and a threaded aperture and may include a leg element having a first end and a second end, the leg element pivotably connected to each of the pairs of connection elements on the first end, and the leg element having a foot extending perpendicularly to the leg element on a second end. Finally, the device may include a threaded rod engaged with the threaded aperture, the threaded rod having a cavity configured to receive a bearing element.

Further disclosed is a kit for removing a harmonic damper pulley. The kit may include a first hub including at least three pairs of connection elements and a first threaded aperture. The kit may further include a second hub including two pairs of connection elements and a second threaded aperture. The kit may also include at least three leg elements having a first end and a second end, the at least three leg elements configured to be pivotably connected to each of the pairs of connection elements on the first end, and each of the at least three leg elements having a foot extending perpendicularly to the leg element on a second end. Relatedly, the kit may include at least three locking pins, each of the at least three locking pins being configured to pivotably connect one of the at least three leg elements to one of the pairs of connection elements. The kit may further include at least one threaded rod configured to engage the first thread aperture and second threaded aperture, the threaded rod having a head on a first end and a cavity on a second end. The kit also includes a plurality of rods, each of the plurality of rods may be a different length and may be configured to be inserted in the cavity of the threaded rod and a cavity of a crankshaft extension. Finally, the kit may include a bearing plug having a first section and a second section, the first section may be configured to engage the threaded rod cavity or one of the plurality or rods, and the second section may include a bearing surface, the bearing surface including a tapered portion and a flat portion.

According to one aspect of the present disclosure, there is provided a pulley pulling device for removing a harmonic damper pulley from a crankshaft, with the harmonic damper pulley having at least two spoke portions. The device includes a hub including at least two clevis portions. A plurality of legs are pivotably connected to respective ones of the clevis portions, with the legs each including a body portion and a foot portion protruding laterally therefrom. The body and foot portions are contoured and oriented relative to each other such that the foot portion is adapted to engage a corresponding one of the spoke portions and to selectively pivot relative thereto as achieves optimized contact therebetween.

The hub may include three clevis portions provided in equidistantly spaced intervals relative to each other. In other implementations, the hub may include two clevis portions provided in opposed relation to each other.

The hub may include a threaded aperture formed therein and spaced from the clevis portions. The device may additionally comprise a threaded rod threadedly engageable to the threaded aperture formed in the hub. The threaded rod may include a cavity extending into the threaded rod from an end portion thereof. The device may additionally include a bearing rod insertable within the cavity of the threaded rod. The hub may be moveable relative to the bearing rod in response to rotation of the threaded rod relative to the hub.

Each clevis portion may include a pair of opposed connection elements defining a gap therebetween, with the gap being sized to receive a respective one of the plurality of legs. Each clevis portion may include a cross bore extending through the pair of opposed connection elements. Each leg may include a leg bore aligned with the cross bore of the clevis portion to which the corresponding leg is connected. The device may further comprise a plurality of locking pins, with each locking pin being advanced through the cross bore of one of the clevis portions and the corresponding leg bore of one of the plurality of legs.

Each foot portion may include an arcuate surface.

Each leg portion may include a first segment and a second segment angularly offset from the first segment. The foot portion may extend from the second segment and may include a planar surface and at least one tooth protruding from the planar surface.

According to another aspect of the present disclosure, the pulley pulling device includes a hub including at least two clevis portions. A shaft is coupled to the hub such that the hub is selectively translatable relative to the shaft. A plurality of legs are pivotably connected to respective ones of the clevis portions, with the legs each including a body portion and a foot portion protruding laterally therefrom. Each leg is pivotal relative to the hub between a first position and a second position, with the foot portion of the leg moving toward the shaft as the leg transitions from the first position toward the second position The body and foot portions are contoured and oriented relative to each other such that the foot portion is adapted to engage a corresponding one of the spoke portions.

The shaft may be rotatable relative to the hub, with the shaft and hub being configured such that rotation of the shaft relative to the hub may cause translation of the hub relative to the shaft.

Each leg may include a pair of opposing side surface, and a leg bore extending therethrough between the pair of opposing side surfaces. The leg bore may define an axis about which the leg is pivotable when the leg is connected to the hub. The foot portion may extend from one of the pair of opposing side surfaces. The foot portion may extend from the leg portion along an arcuate curve.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of certain embodiments of a harmonic damper pulley puller and related method of forming the same and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
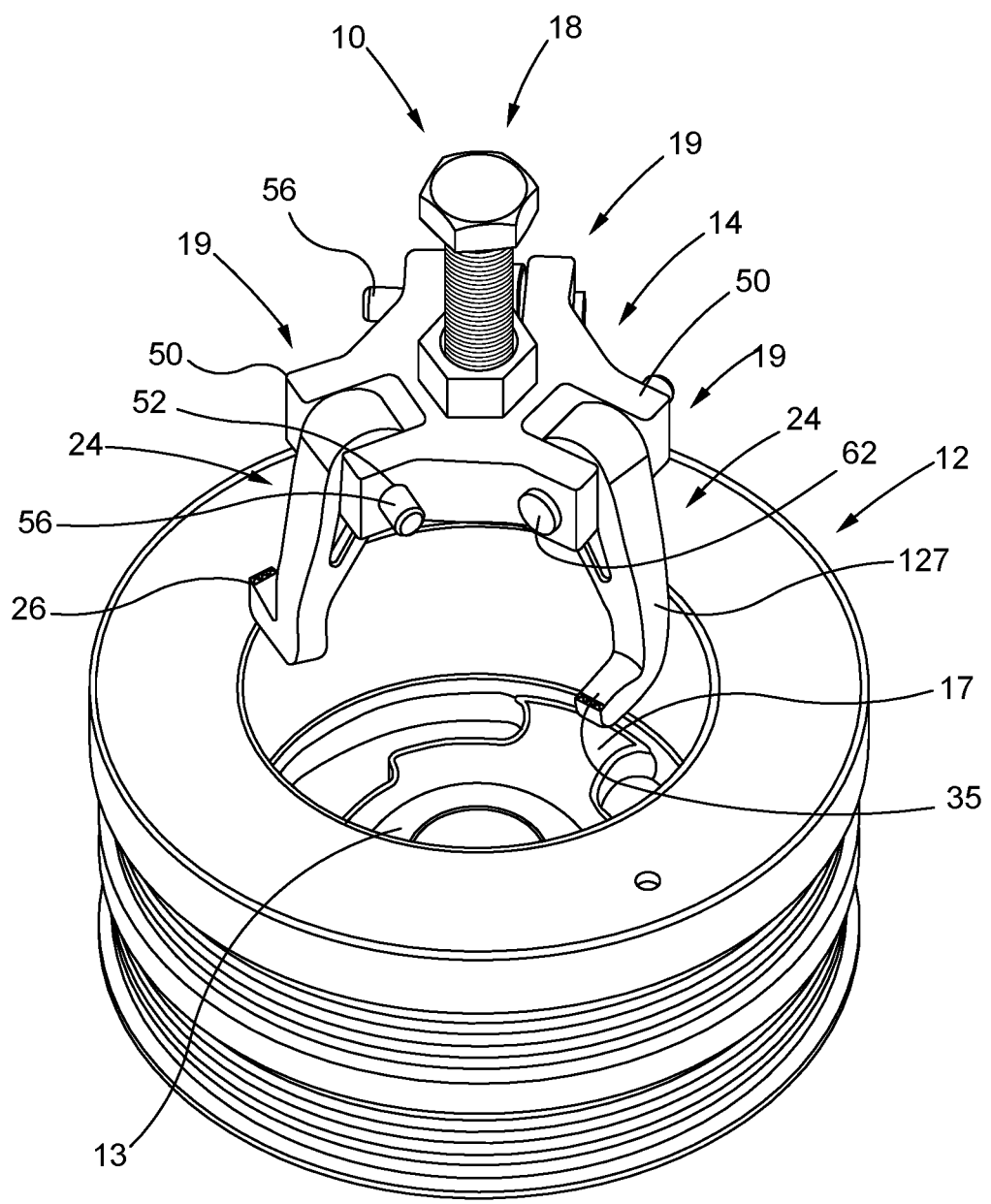
FIG. 1 is a perspective view of a first embodiment of the harmonic damper pulley puller in an exploded orientation relative to an exemplary pulley with which the pulley puller is adapted to releasably engage.

FIG. 1 shows a first embodiment of the harmonic damper pulley puller 10 in conjunction with an exemplary harmonic damper pulley 12. In one embodiment, the pulley puller 10 includes a central hub 14, a threaded actuation rod 18, and three legs 24 pivotably attached to the hub 14. The structural attributes of each of the three legs 24 will be described in more detail below. Although the embodiment shown in FIG. 1 includes three legs 24, this is by way of example only and not of limitation. Alternative contemplated embodiments may include two legs 24, though any additional number of legs are also possible with suitable modifications to the hub 14.

The exemplary pulley 12 with which the pulley puller 10 is used defines a central hub portion 13 which is concentrically positioned with a circular peripheral wall portion 15. The hub portion 13 is integrally connected to the wall portion 15 by a plurality of spoke portions 17 which are typically arranged at equidistantly spaced intervals from each other. A central aperture extends through the hub portion 13, such aperture accommodating a crank shaft extension 32 including an elongate aperture or cavity 33 which extends axially therein and defines a closed inner end 36.

Figure 2:
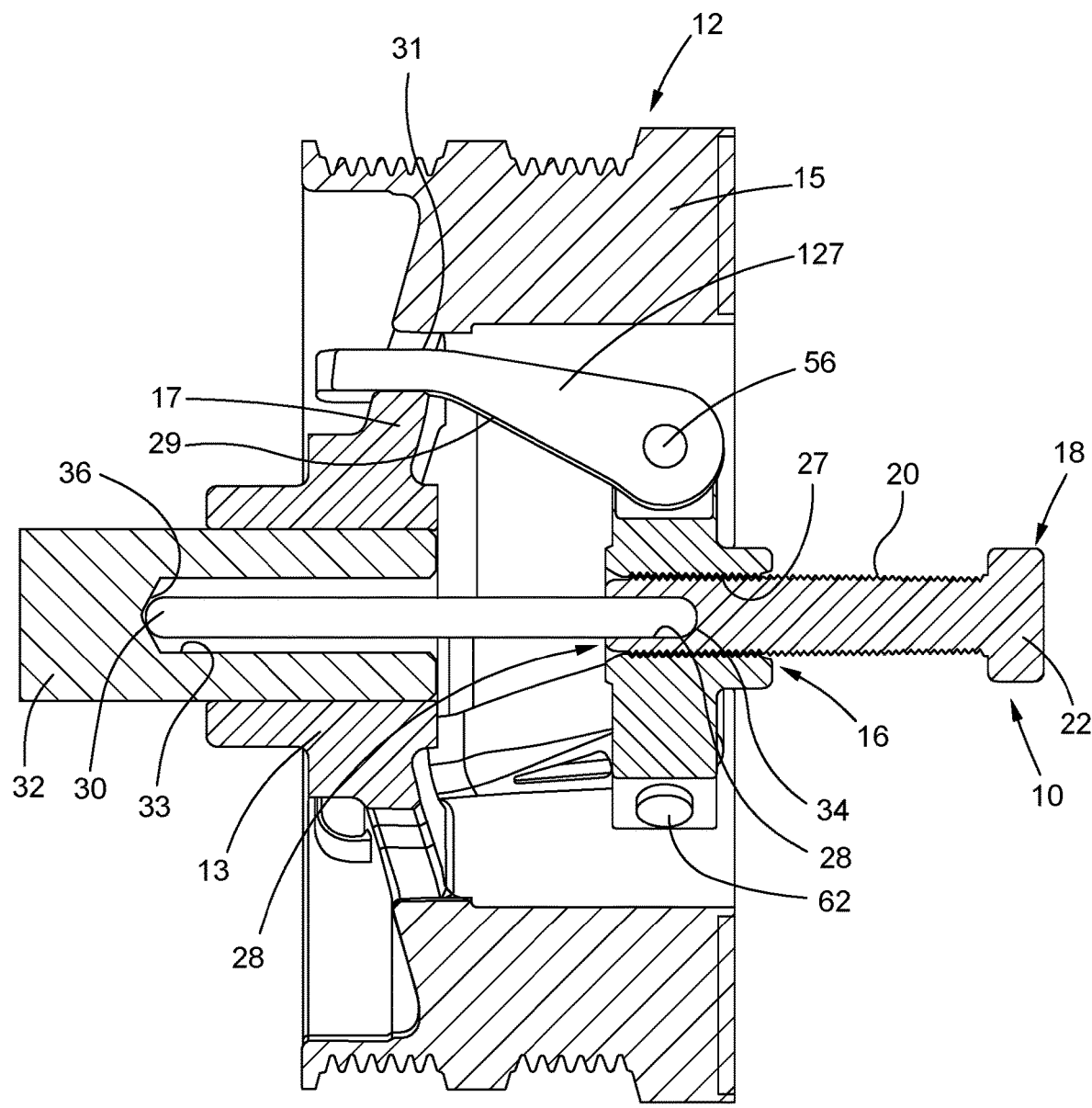
FIG. 2 is a cross-sectional plan view of the pulley puller of FIG. 1 as cooperatively engaged to the pulley, further depicting an exemplary rod used in conjunction with the pulley puller to provide a bearing surface against the pulley.
Figure 3:
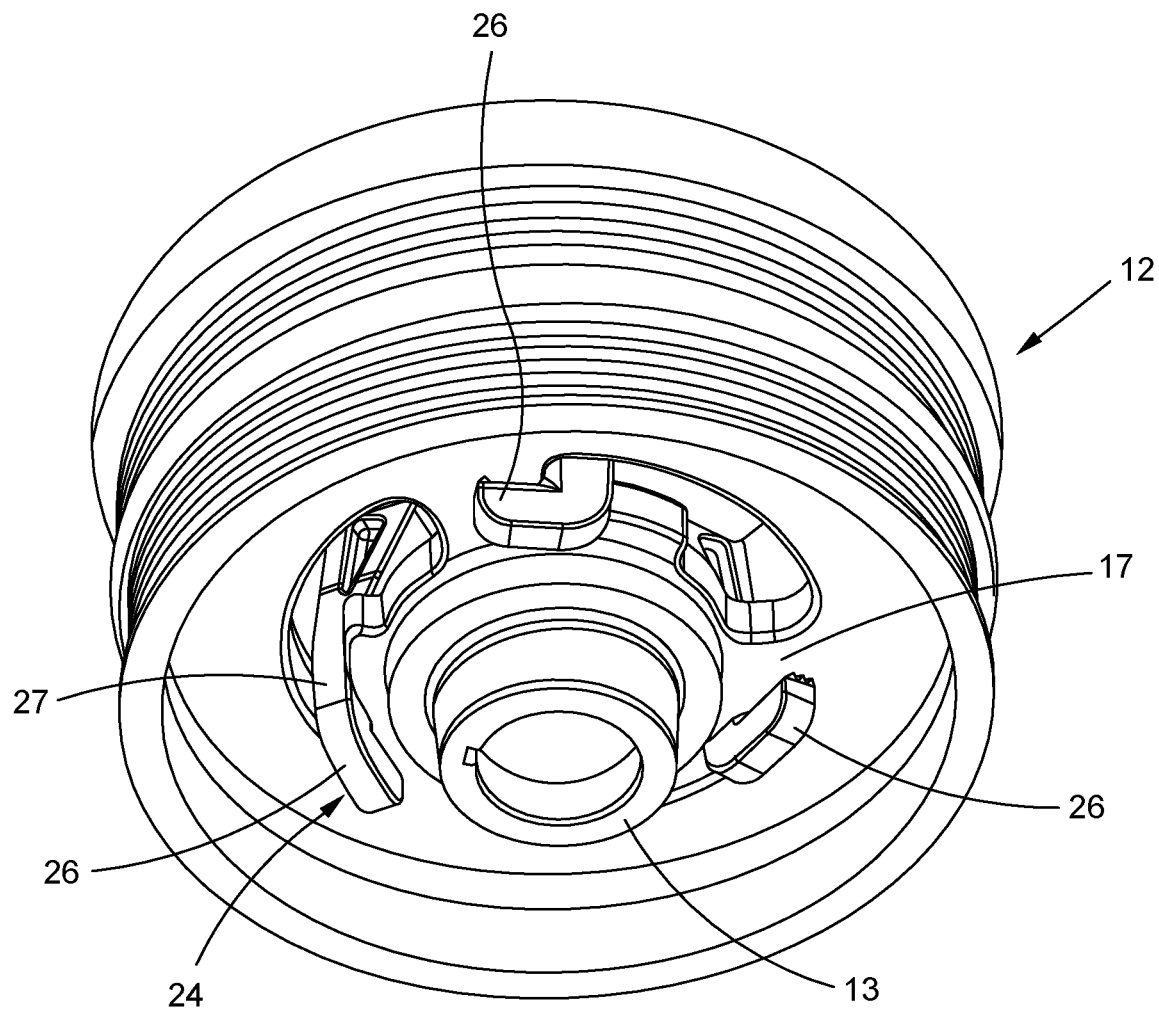
FIG. 3 is a perspective view depicting the legs and feet of the pulley puller as cooperatively engaging the spokes of the pulley.
Figure 4:
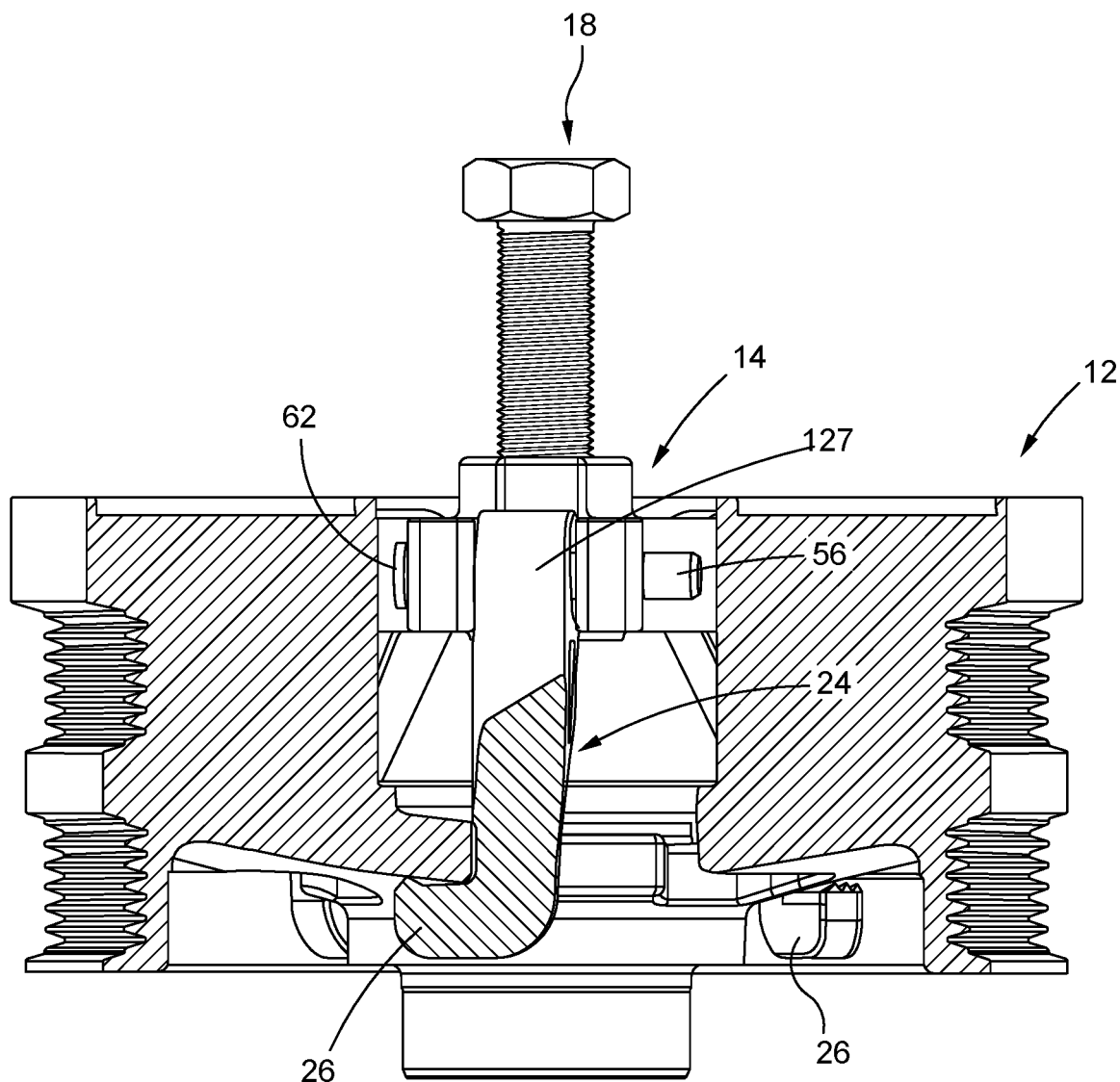
FIG. 4 is a plan cross-sectional view of the pulley puller of FIG. 3.
Figure 5:
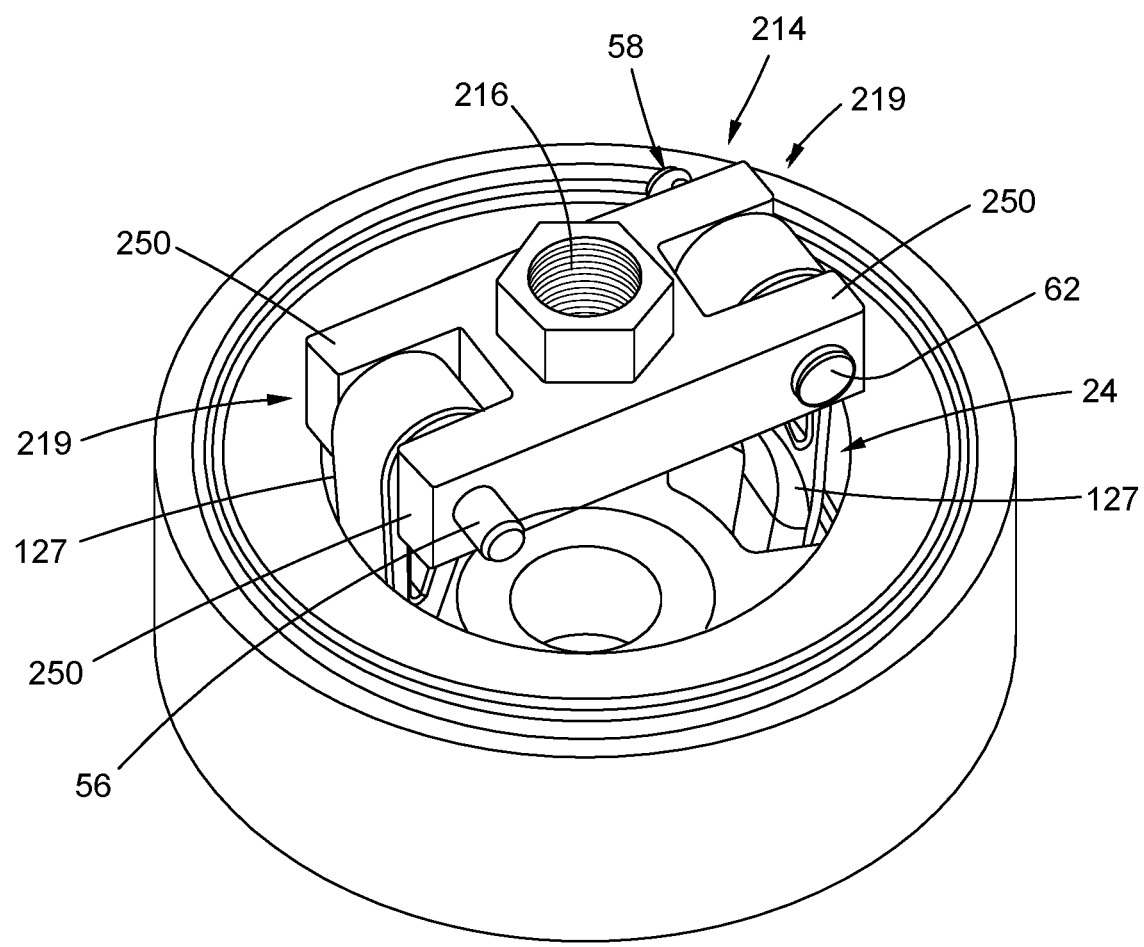
FIG. 5 is a perspective view of a second embodiment of the pulley puller as cooperatively engaged to an exemplary pulley.
Figure 6:
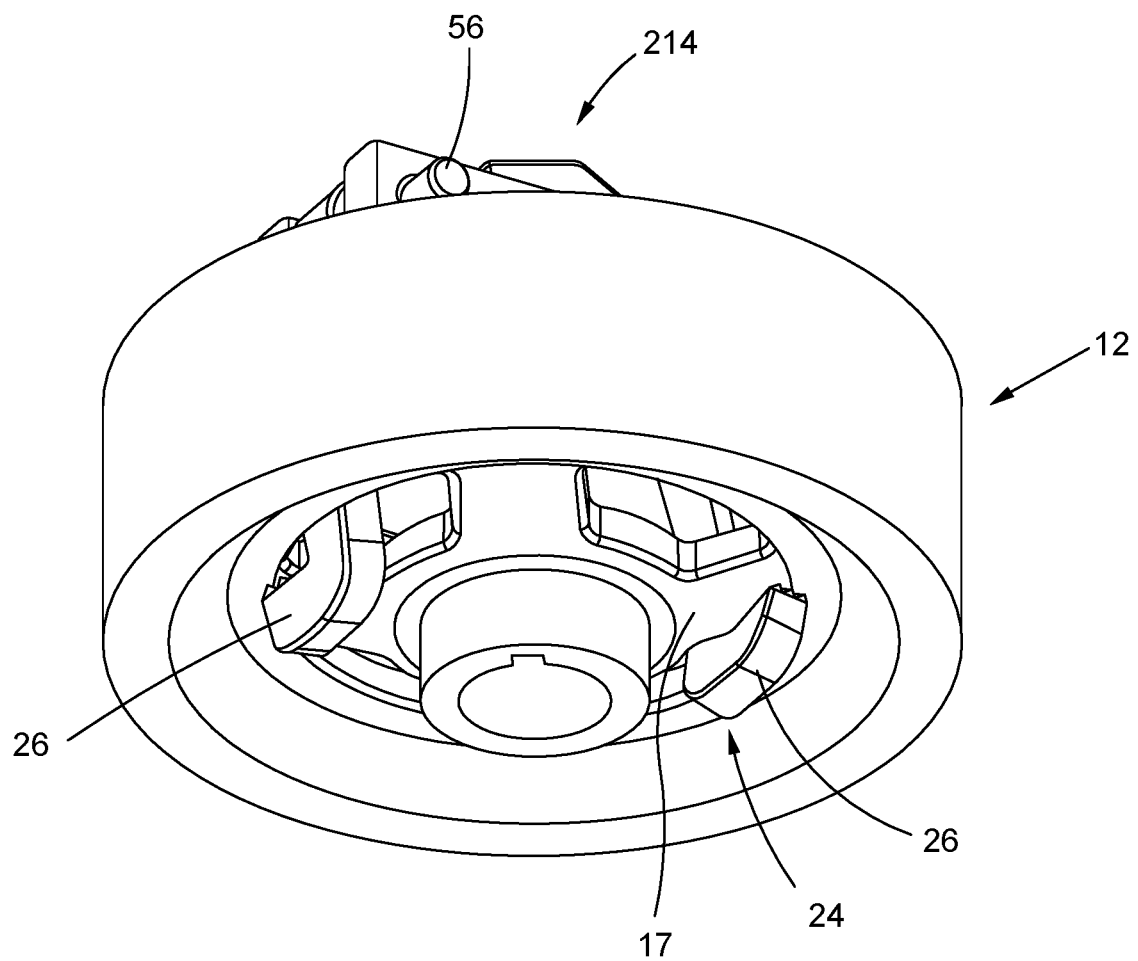
FIG. 6 is another perspective view of the second embodiment of the pulley puller, depicting the legs and feet thereof as cooperatively engaged to the spokes of the pulley.
Figure 7:
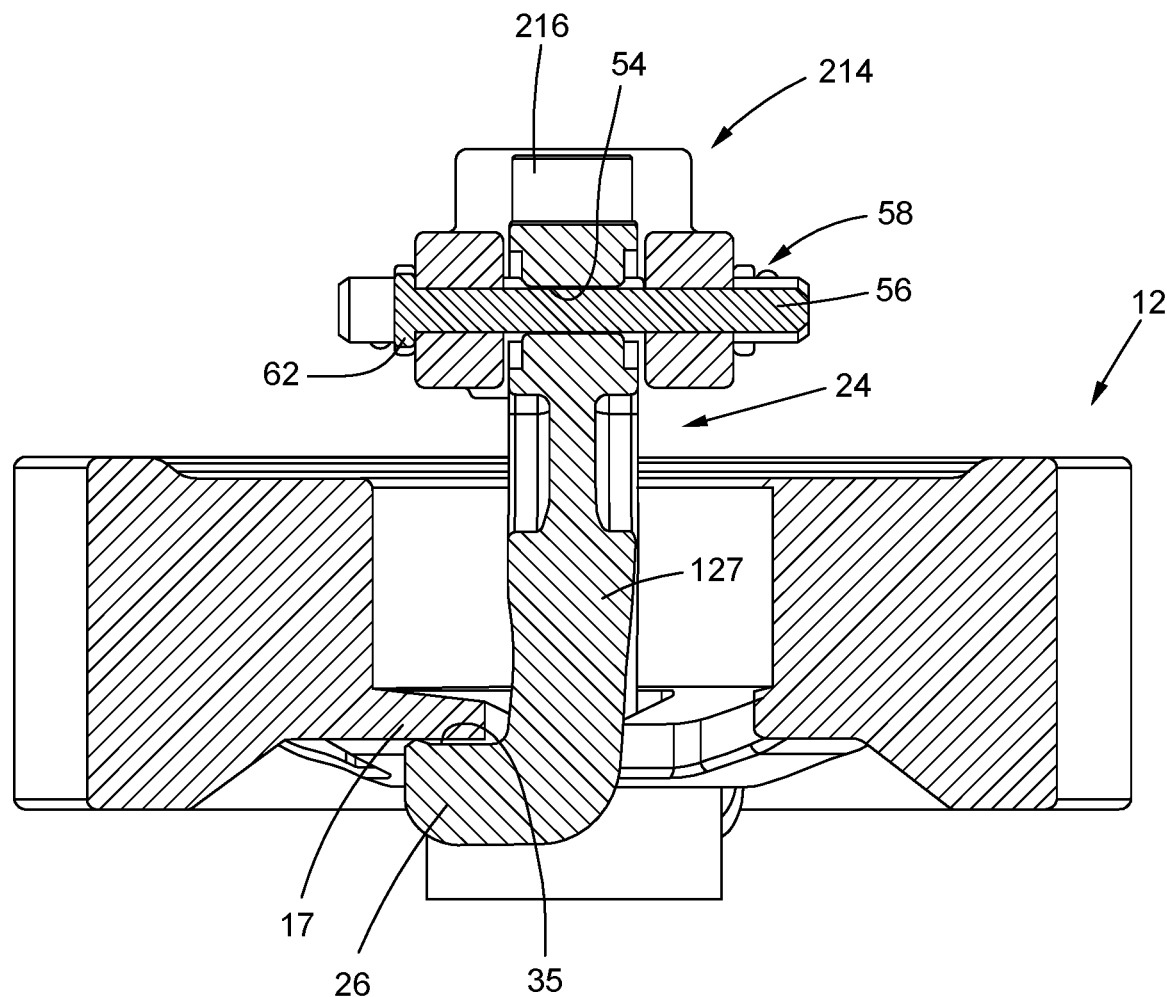
FIG. 7 is a plan cross-sectional view of the second embodiment of the pulley puller shown in FIG. 6.
Figure 8:
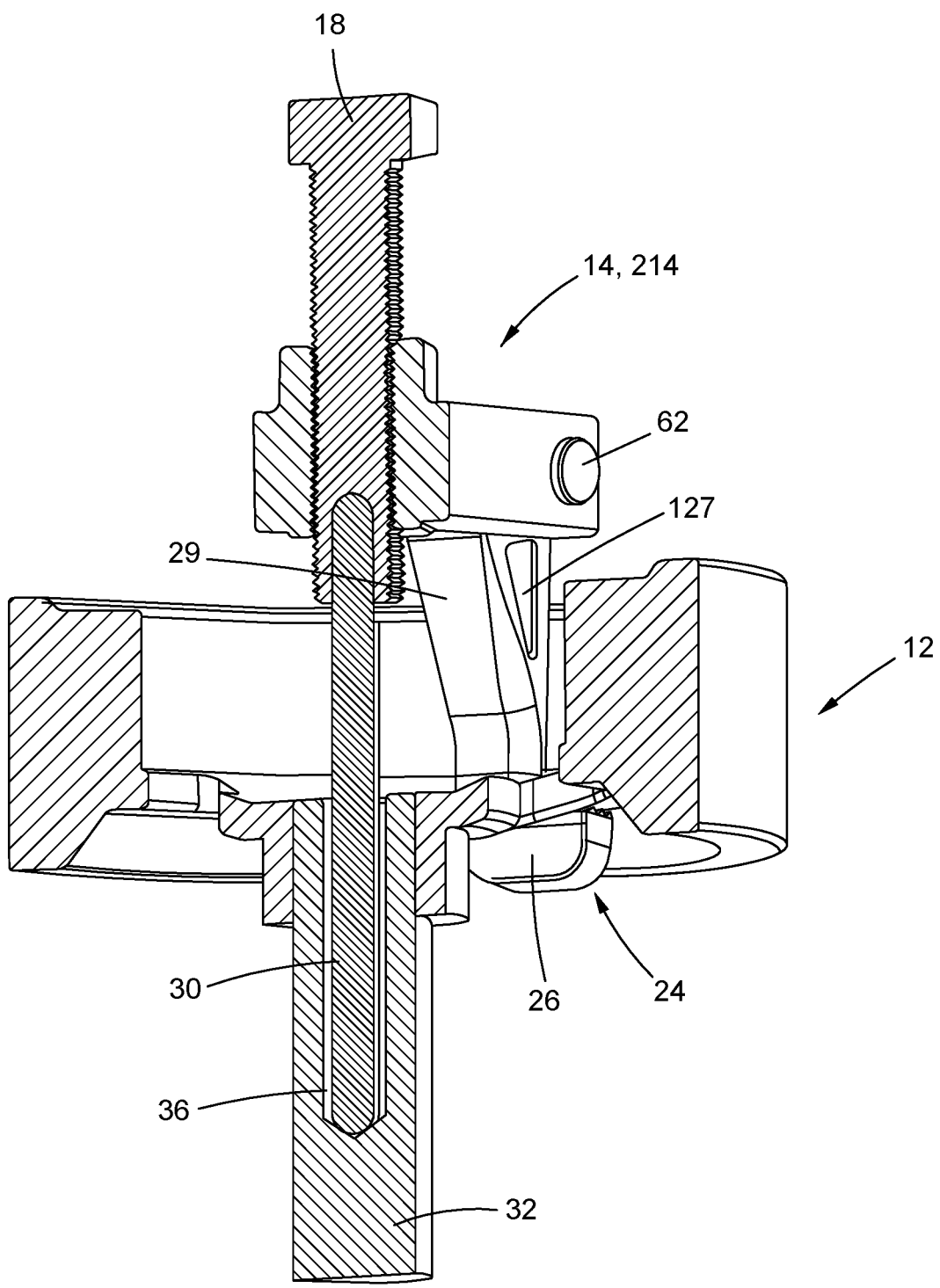
FIG. 8 is a perspective cross-sectional view of the second embodiment of the pulley puller similar to FIG. 7, but further depicting an exemplary rod used in conjunction with the pulley puller to provide a bearing surface against the pulley.

As shown in FIGS. 1 and 2, the hub 14 defines a central aperture 16 and three (3) peripheral clevis portions 19 which are separated from each other at equidistantly spaced intervals of approximately 120°. The central aperture 16 may be internally threaded to include female threads 27 which are complementary to the male threads 20 of the rod 18. Thus, the actuation rod 18 may be threadably advanced into the central aperture 16. The threaded rod 18 may further have a head 22 with a standardized shape. For example, the head 22 may have a standardized bolt shape. Thus, using the head 22, the threaded rod 18 may be turned by tools, such as a ratchet, a wrench, or an impact wrench.

As shown in FIG. 2, the threaded rod 18 may include a cavity 28 extending axially within the end thereof opposite that with the head 22. The cavity 28 may be configured to receive one end portion of a rod 30 which is adapted to contact and bear against a closed inner end 34 of the cavity 28. In use of the pulley puller 10, the rod 30 provides a bearing surface for the pulley puller 10 against the crank shaft extension 32, as allows the pulley 12 to be effectively pulled or separated from its engagement thereto. Along these lines, whereas one end portion of the rod 30 is advanced into the cavity 28 to bear against the closed inner end 34 thereof, the opposite end portion is advanced into the aperture 33 to bear against the closed end 36 thereof. The rod 30 may be chosen by a user depending on the relative orientations of the crank shaft extension 32 and pulley 12. Along these lines, it is contemplated that the harmonic damper pulley puller 10 may be included with a kit. The kit may include several rods 30 of differing lengths. If an operative distance between the closed inner end 34 of the cavity 28 and the closed end 36 of the cavity 33 is longer than the longest rod 30 in the kit, a user may choose to use an alternate bearing component to achieve the desired bearing action.

Figure 9:
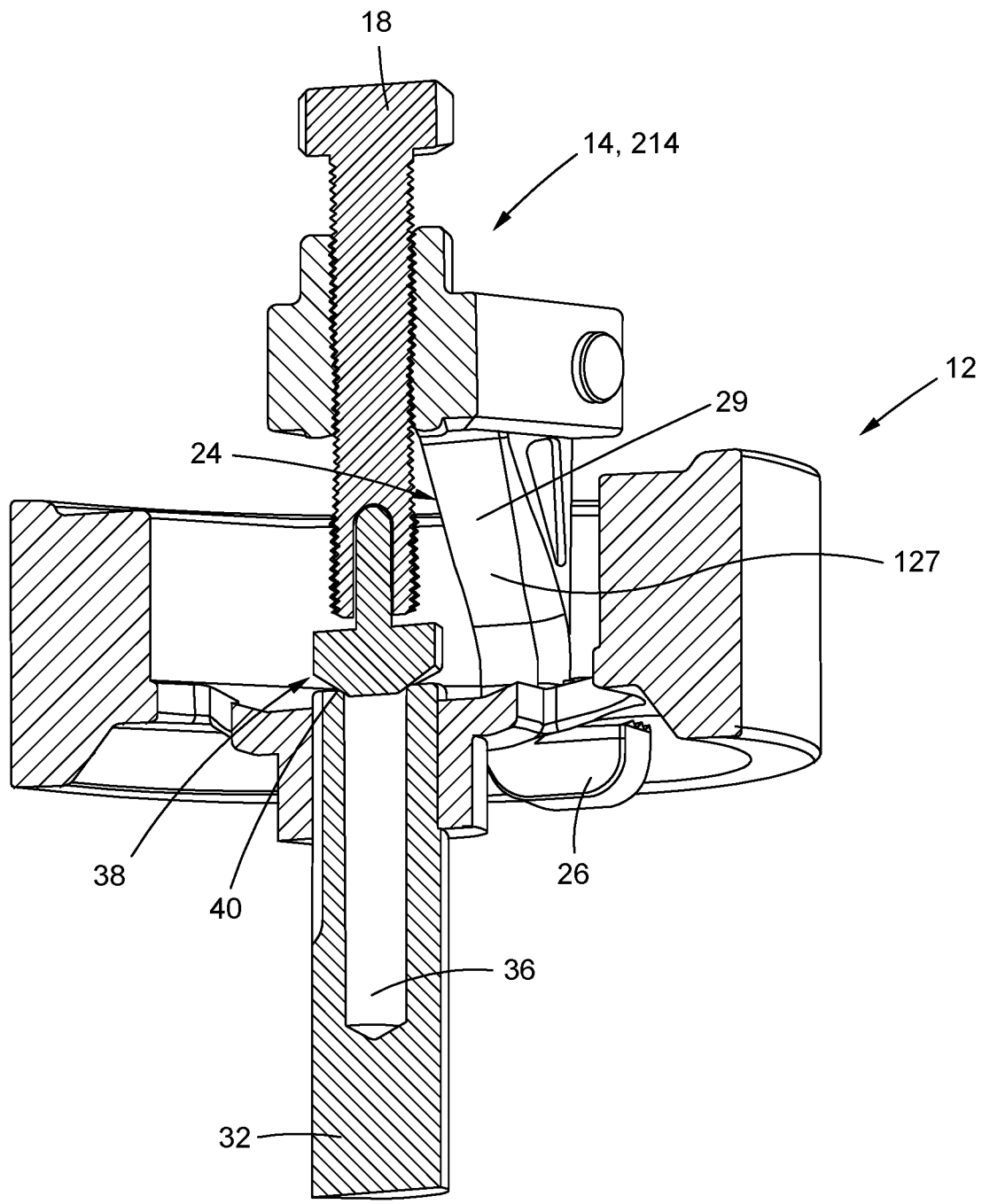
FIG. 9 is a perspective cross-sectional view of the second embodiment of the pulley puller similar to FIG. 8 but used in conjunction with a bearing plug as an alternative to a rod to create a bearing surface against the pulley.
Figure 10:
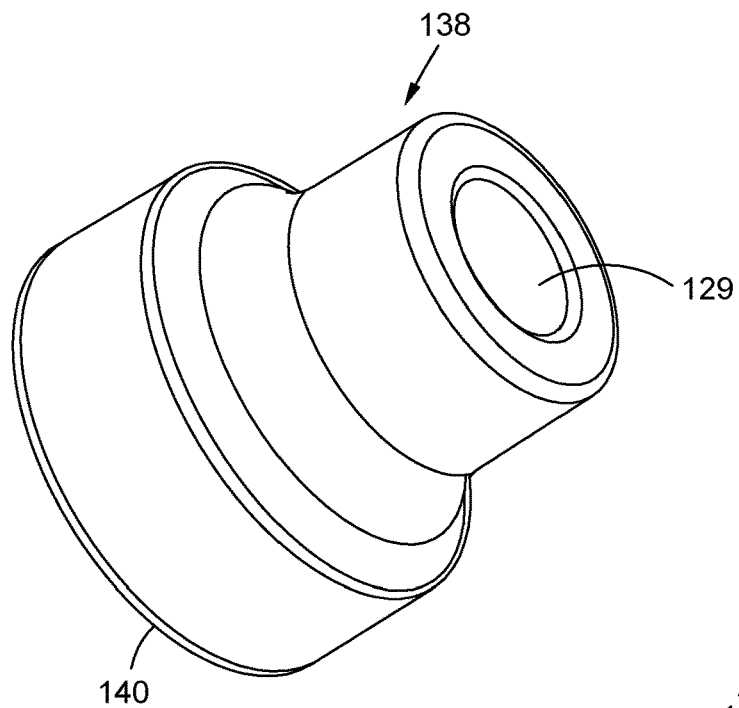
FIG. 10 is a perspective view of an alternative embodiment of the bearing plug shown in FIG. 9 which is adapted for use in combination with a rod.
Figure 11:
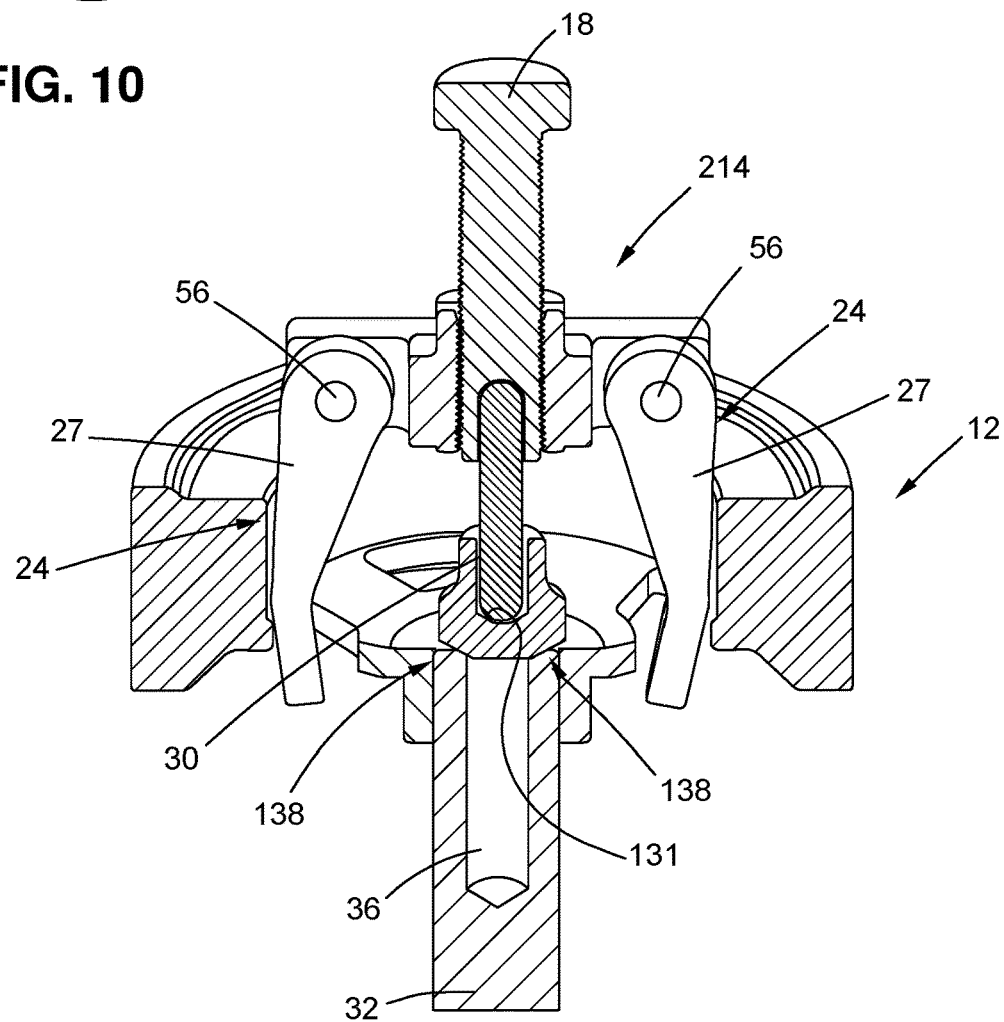
FIG. 11 is a perspective cross-sectional view similar to FIG. 9 but depicting the bearing plug and rod combination of FIG. 10 as used in substitution for the bearing plug of FIG. 9.

In greater detail, as shown in FIGS. 9-11, the kit may be further provided with a bearing plug. In one iteration, the bearing plug takes the form of a button plug 38 having an enlarged head portion and a shaft portion which protrudes axially from the head portion. The shaft portion of the button plug 38 may have a cross section substantially the same as the rod 30 and may be advanced into the cavity 28. The head portion of the button plug 38 may have a bearing surface 40 adapted for placement against an open end 44 of the cavity 33 of the crank shaft extension 32. The bearing surface 40 may have a substantially circular perimeter larger than an interior circumference of an open end of the cavity 33, and a tapered portion extending between the circular perimeter and a central flat portion. The central flat portion of the bearing surface 40 may be sized such that the central flat portion has an outer circumference less than the inner circumference of the open end of the cavity 33 of the crank shaft extension 32.

Alternatively, the bearing plug may take the form of a cap plug 138 as shown specifically in FIGS. 10 and 11. The cap plug 138 may have its own cavity 129 extending axially within one end thereof. A rod 30 may be inserted in the cavity 28 and the cavity 129, the opposed ends of such rod 30 ultimately bearing against the closed inner end 34 of the cavity 28 and the closed inner end 131 defend by the cavity 129. The cap plug 138 defines a head portion, the structural attributes of which mirror those of the head portion of the button plug 38 as described above. In this regard, the head portion of the cap plug 138 may have a bearing surface 140 adapted for placement against the open end of the cavity 33 of the crank shaft extension 32. The bearing surface 140 may have a substantially circular perimeter larger than an interior circumference of an open end of the cavity 33, and a tapered portion extending between the circular perimeter and a central flat portion. The central flat portion of the bearing surface 140 may be sized such that the central flat portion has an outer circumference less than the inner circumference of the open end of the cavity 33 of the crank shaft extension 32.

Each clevis portion 19 of the hub 14 may define a pair of connection elements (e.g., arms) 50. Each connection element 50 of the pair is connected to a central portion of the hub 14 and includes a transverse cross bore 52. That is, the cross bore 52 runs in a direction perpendicular to a longitudinal axis of the corresponding connection element 50. The cross bores 52 on one connection element 50 of each clevis portion 19 aligns with the cross bore 52 on the other connection element 50 of the same clevis portion 19.

A kit may include several differently configured of hubs, each of which may be optionally integrated into the pulley puller 10 as allows for the use thereof in conjunction with pulleys of differing structural attributes, the pulley 12 and corresponding crank shaft extension 32 being only one exemplary combination as indicated above. For example, a kit may have the hub 14 as described above with at least three pairs of connection elements 50 defined by respective ones of the at least three clevis portions 19. In addition, or as an alternative to the hub 14, the kit may include a hub 214 as shown in FIGS. 5-9 and 11. The hub 214 is provided with a central aperture 216 mirroring the structural and functional attributes of the aperture 16, and two clevis portions 219 in opposed relation to each other. Each of the clevis portions 219 defines a pair of connection elements 250, each of the connection elements 250 including a cross bore 252 mirroring the structural attributes of the cross bore 52.

In either version of the hub 14, 214, one of the legs 24 attaches to the pairs of connection elements 50, 250 of the corresponding clevis portion 19, 219. Each leg 24 may include a pin holding bore 54. The cross bores 52, 252 in each of the connection elements 50, 250 and the pin holding bore 54 of the leg 24 all align to collectively define a common bore extending along a common axis. A locking pin 56 may be placed in the common bore in order to pivotably attach each leg 24 to each pair of connection elements 50, 250. Each leg 24 may pivot around the corresponding locking pins 56 until the leg 24 contacts some other component of the harmonic damper pulley puller 10. The pivoting motion of the legs 24 may cause the each leg 24 to move either toward a central axis defined by the central aperture 16, 216, or away from the central axis defined by the central aperture 16, 216. The locking pin 56 may include a locking element 58 which prevents the locking pin 56 from moving out of the common bore unintentionally. The locking element 58 may be a protrusion which may be biased outward from an outer circumference of the locking element 58, which prevents the locking element 58 from passing through the common bore. Alternatively, the locking pin 56 may include a second pin placed in a bore perpendicular through the locking pin 56 proximate a distal end of the locking pin 56. A first end of the locking pin 56 may have a head 62 which prevents the locking pin 56 from passing through the common bore in a direction opposite that otherwise impeded by the locking element 58. It is contemplated that spring elements may be integrated between each leg 24 and its corresponding clevis portion 19, 219 so as to provide at least some measure of frictional resistance as prevents the legs from freely dangling relative to the associated hub 14, 214. In this regard, by the action of these spring elements, each leg 24 will effectively be maintained in any angular orientation into which it is manually manipulated relative to the hub 14, 214.

Each of the legs 24 has a generally L-shaped or hook-shaped profile, including a foot portion 26 protruding laterally from one end portion thereof. In greater detail, each leg 24 has a body portion 127 having a generally tear-drop shaped profile. The enlarged, bulbous end of the body portion 127 is that which defines the above-described pin holding bore 54. As is apparent from FIGS. 1-2 and others, a distal region of the body portion 127 is angularly offset relative to the remainder thereof. An exemplary angular offset range is from 130-170 degrees, and preferably from 145-170 degrees. Thus, one surface 29 of the body portion 127 is slightly concave, with the opposite surface 31 being slightly convex.

The foot portion 26 protrudes laterally from this distal region. Along these lines, the foot portion 26 is shaped and oriented relative to the body portion 127 such that prescribed peripheral edge regions of both the foot portion 26 (i.e., the edge region 35) and the body portion 127 extend at approximately 90° (i.e., a right angle) relative to each other. When attached to the hub 14, the foot portions 26 of the legs 24 point in the same direction such that no two of the foot portions 26 face each other. When attached to the hub 214, the foot portions 26 of the legs 24 point in the opposite directions.

In operation, a rod 30 alone or in combination with the button plug 38 or cap plug 138 is cooperatively engaged to both the rod 18 and crank shaft extension 32 in the aforementioned manner as needed to achieve the desired bearing action. As part of this process, the hub 14, 214 is advanced into the interior of the pulley 12 such that the distal portions of the legs 24, and notably each foot portion 26, is advanced through the opening or space defined between a corresponding pair of spoke portions 17 of the pulley 12. The hub 14, 214 is then rotated such that at least that peripheral edge region 35 of each foot portion 26 contacts or is at least aligned with and capable of contacting a corresponding spoke portion 17. If such contact is not facilitated at the outset, the rotation of the actuation rod 18 is a prescribed direction that facilitates the movement of the hub 14, 214 relative thereto as eventually results in the engagement of the legs 24, and in particular the foot portions 26 thereof, to respective ones of the spoke portions 17. As a result of the frictional resistance between the pulley 12 and the crank shaft extension 32, the continued rotation of the actuation rod 18 will result in the initiation of the bearing action described above, culminating in the eventual removal of the pulley 12 the crank shaft extension 32.

The unique shape/profile of each leg 24 as shown in the figures and described above, considered in concert with the manner in which the legs 24 are pivotally connected to the hub 14, 214, achieves a unique effect during use of the pulley puller 10 as outfitted with either of the hubs 14, 214. In greater detail, the effect is one wherein during the rotation of the actuation rod 18, the legs 24 which tend to move or shift along a corresponding surface of the associated spoke portion 17 as facilitates the achievement of the maximum available level of abutting contact therebetween.

Figure 12:
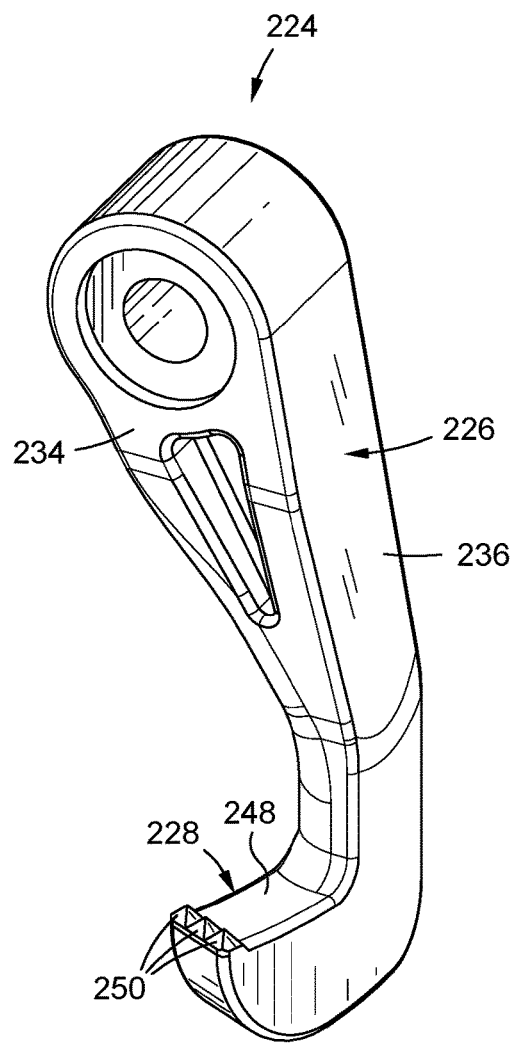
FIG. 12 is an upper perspective view of another embodiment of a leg which may be incorporated into the pulley puller.
Figure 13:
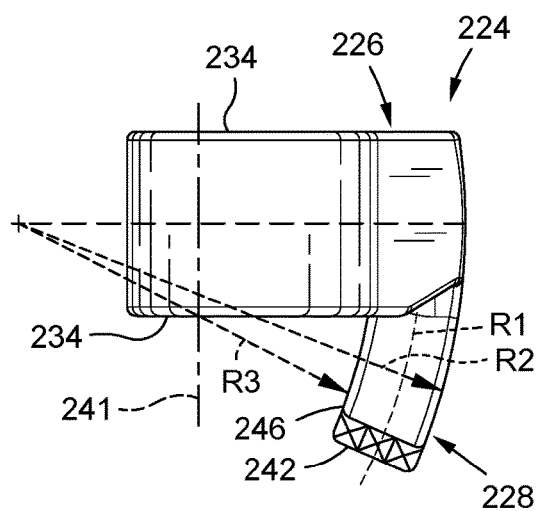
FIG. 13 is a top view of the leg depicted in FIG. 12.
Figure 14:
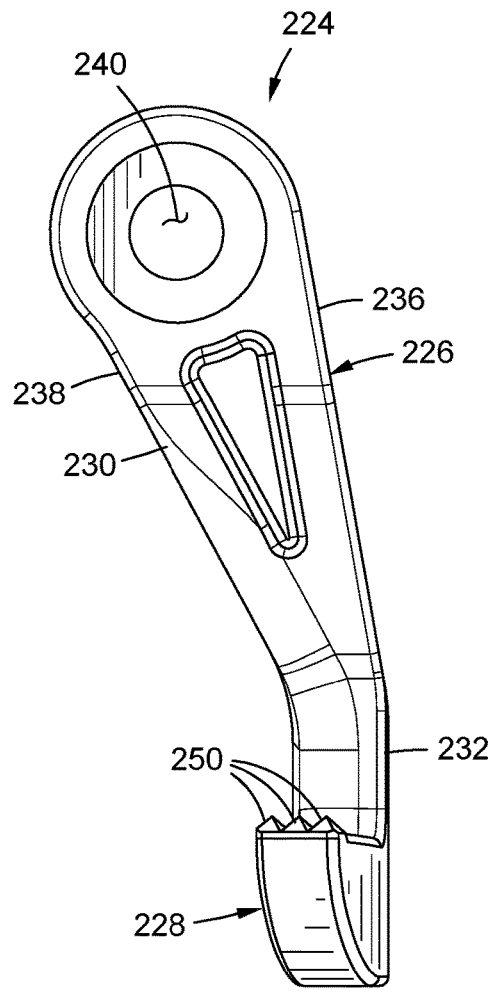
FIG. 14 is a side view of the leg depicted in FIG. 12.

Referring now to FIGS. 12-14, there is depicted another embodiment of a leg 224 that may be used in place of the leg 24 described above. The primary distinction between the leg 224 shown in FIGS. 12-14 from the leg 24 discussed above is the configuration of the foot portion, which may facilitate insertion of the foot portion between adjacent spoke portions 17 on the on the pulley 12.

In more detail, the leg 224 includes a body portion 226 and a foot portion 228. The body portion 226 includes a first segment 230 and a second segment 232 angularly offset from the first segment 230. The body portion 226 also includes a pair of opposed side surfaces 234, a first face 236, and a second face 238, all of which extend along both the first and second segments 230, 232. A bore 240 extends through the body portion 226 between the opposed side surfaces 234 and is configured to receive the locking pin 56 discussed in more detail above.

The foot portion 228 extends from the body portion 226, and more specifically, from one of the side surfaces 234 thereof, and terminate to define a distal edge 242. In one embodiment, the foot portion 228 may extend along an arcuate curve represented by R1 in FIG. 13, such that when the foot portion 228 is viewed from the perspective depicted in FIG. 13, the foot portion extends toward an axis 241 defined by the bore 240. The arcuate configuration of the foot portion 228 may define a convex surface 244 and a concave surface 246. The convex surface may be associated with an outer radius R2 and the concave surface may be associated with an inner radius R3. The arcuate configuration of the foot portion 228 may allow the foot portion 228 to extend between adjacent spoke portions 17 to facilitate engagement with the pulley 12.

The foot portion 228 may also include a generally planar surface 248 extending from the body portion 226 and at least one tooth 250 extending from the planar surface 248. The teeth 250 may be configured to aid in maintaining engagement between the leg 224 and the pulley 12 when the leg 224 is advanced through the openings in the pulley 12.

The above description is given by way of example, and not limitation. Given the above disclosure, one skilled in the art could devise variations that are within the scope and spirit of the invention disclosed herein, including various ways of designing the hub. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A pulley pulling device for removing a harmonic damper pulley from a crankshaft, the harmonic damper pulley having at least two spoke portions, the device comprising:
    a hub including at least two clevis portions, the hub being disposed about a central axis; and
    a plurality of legs pivotably connected to respective ones of the clevis portions, the legs each including a body portion and a foot portion protruding from the body portion, the body portion having a first face facing away from the central axis, a second face opposite the first face and facing toward the central axis, and a side surface extending between the first and second faces, the foot portion extending from the side surface;
    wherein the body and foot portions are contoured and oriented relative to each other such that the foot portion is adapted to engage a corresponding one of the spoke portions and to selectively pivot relative thereto as achieves optimized contact therebetween.

2. The device of claim 1, wherein the hub has three of the clevis portions provided in equidistantly spaced intervals relative to each other.

3. The device of claim 1, wherein the hub has two of the clevis portions provided in opposed relation to each other.

4. The device of claim 1, wherein the hub includes a threaded aperture formed therein and spaced from the at least two clevis portions.

5. The device of claim 4, further comprising a threaded rod threadedly engageable to the threaded aperture formed in the hub.

6. The device of claim 5, wherein the threaded rod includes a cavity extending into the threaded rod from an end portion thereof.

7. The device of claim 6, further comprising a bearing rod insertable within the cavity of the threaded rod, the hub being moveable relative to the bearing rod in response to rotation of the threaded rod relative to the hub.

8. The device of claim 1, wherein each clevis portion includes a pair of opposed connection elements defining a gap therebetween, the gap being sized to receive a respective one of the plurality of legs.

9. The device of claim 8, wherein each clevis portion includes a cross bore extending through the pair of opposed connection elements.

10. The device of claim 9, wherein each leg includes a leg bore aligned with the cross bore of the clevis portion to which the corresponding leg is connected.

11. The device of claim 10, further comprising a plurality of locking pins, each locking pin being advanced through the cross bore of one of the clevis portions and the corresponding leg bore of one of the plurality of legs.

12. The device of claim 1, wherein each foot portion includes an arcuate surface.

13. The device of claim 1, wherein each body portion includes a first segment and a second segment angularly offset from the first segment.

14. The device of claim 13, wherein the foot portion extends from the second segment.

15. The device of claim 14, wherein the foot portion includes a planar surface and at least one tooth protruding from the planar surface.

16. A pulley pulling device for removing a harmonic damper pulley from a crankshaft, the harmonic damper pulley having at least two spoke portions, the device comprising:
- a hub including at least two clevis portions, the hub being disposed about a central axis;
- a shaft coupled to the hub such that the hub is selectively translatable relative to the shaft; and
- a plurality of legs pivotably connected to respective ones of the clevis portions, the legs each including a body portion and a foot portion protruding from the body portion, the body portion having a first face facing away from the central axis, a second face opposite the first face and facing toward the central axis, and a side surface extending between the first and second faces, the foot portion extending from the side surface, each leg being pivotal relative to the hub between a first position and a second position, the foot portion of the leg moving toward the shaft as the leg transitions from the first position toward the second position;
- wherein the body and foot portions are contoured and oriented relative to each other such that the foot portion is adapted to engage a corresponding one of the spoke portions.

17. The device of claim 16, wherein the shaft is rotatable relative to the hub, the shaft and the hub being configured such that rotation of the shaft relative to the hub causes translation of the hub relative to the shaft.

18. The device of claim 16, wherein each leg includes a pair of opposing side surface, and a leg bore extending therethrough between the pair of opposing side surface, the leg bore defining an axis about which the leg is pivotable when the leg is connected to the hub, the foot portion extending from one of the pair of opposing side surfaces.

19. The device of claim 18, wherein the foot portion extends from the body portion along an arcuate curve.

20. The device of claim 18, wherein the body portion includes a first segment and a second segment angularly offset from the first segment.

\* \* \* \* \*